United States Patent [19]
Sheng

[11] Patent Number: 5,915,658
[45] Date of Patent: Jun. 29, 1999

[54] BASE SEAT STRUCTURE FOR LIQUID CRYSTAL TYPE DISPLAY

[75] Inventor: Chia-Ming Sheng, Keelung, Taiwan

[73] Assignee: Compal Electronics, Inc., Taipei, Taiwan

[21] Appl. No.: 08/908,480

[22] Filed: Aug. 6, 1997

[51] Int. Cl.[6] .................................................. A47B 91/00
[52] U.S. Cl. .................... 248/346.06; 248/371; 248/917; 248/922
[58] Field of Search ..................................... 248/917, 919, 248/920, 921, 922, 923, 371, 133, 139, 393, 282.1, 279.1, 446, 454, 346.01, 346.05, 346.06; 349/58, 59; 361/681

[56] References Cited

U.S. PATENT DOCUMENTS 5,831,696  11/1998  Sheng ......................................... 349/58

Primary Examiner—Ramon O. Ramirez
Attorney, Agent, or Firm—Pro-Techtor Inter-National Services

[57] ABSTRACT

A base seat structure for liquid crystal type display, including a base seat having a seat face, a support pivotally connected on the seat face and a bridge mechanism disposed on the seat face and having a sleeve member. An adjustment rod is passed through the sleeve member with a tail end pivotally connected with the support for controlling the movement and position of the support so as to adjust the observation angle of the display.

6 Claims, 4 Drawing Sheets

BASE SEAT STRUCTURE FOR LIQUID CRYSTAL TYPE DISPLAY

BACKGROUND OF THE INVENTION

The present invention relates to a base seat structure for liquid crystal type display, which stably locates the display and enables a user to freely adjust the observation angle thereof.

It is known that a liquid crystal type display is installed on a base seat which permits the observation angle of the display to be adjusted. The base seat is equipped with a support which is pivotally connected therewith by a pivot shaft for retaining the display.

The pivot shaft includes hinge mechanism and resilient members to provide fastening force and frictional force so as to locate the support at different angles. The pivot shaft is always kept fastened to bear the weight of the display so that when adjusting the angle of the display, a considerably great force must be exerted onto the support against the frictional force. After a period of use, the pivot shaft is subject to wearing and tends to loosen. As a result, it will become difficult to reliably locate the display at a desired observation angle.

Also, the fastening structure of the pivot shaft is relatively fine and sophisticated. It is difficult to install the fastening structure into the narrow interior of the pivot shaft and it is necessary to further process the pivot shaft. Therefore, the manufacturing cost is increased.

SUMMARY OF THE INVENTION

It is a primary object of the present invention to provide a base seat structure for liquid crystal display, which has simple structure and is able to more reliably locate the display at a desired observation angle without loosening even in the case that the display is hung on a wall.

According to the above object, the base seat structure of the present invention includes a base seat having a seat face, a support pivotally connected on the seat face and a bridge mechanism disposed on the seat face and having a sleeve member. An adjustment rod is passed through the sleeve member with a tail end pivotally connected with the support for controlling the movement and position of the support so as to adjust the observation angle of the display.

The present invention can be best understood through the following description and accompanying drawings, wherein:

DETAILED DESCRIPTION OF THE PREFERRED EMBODIMENT

Figure 1:
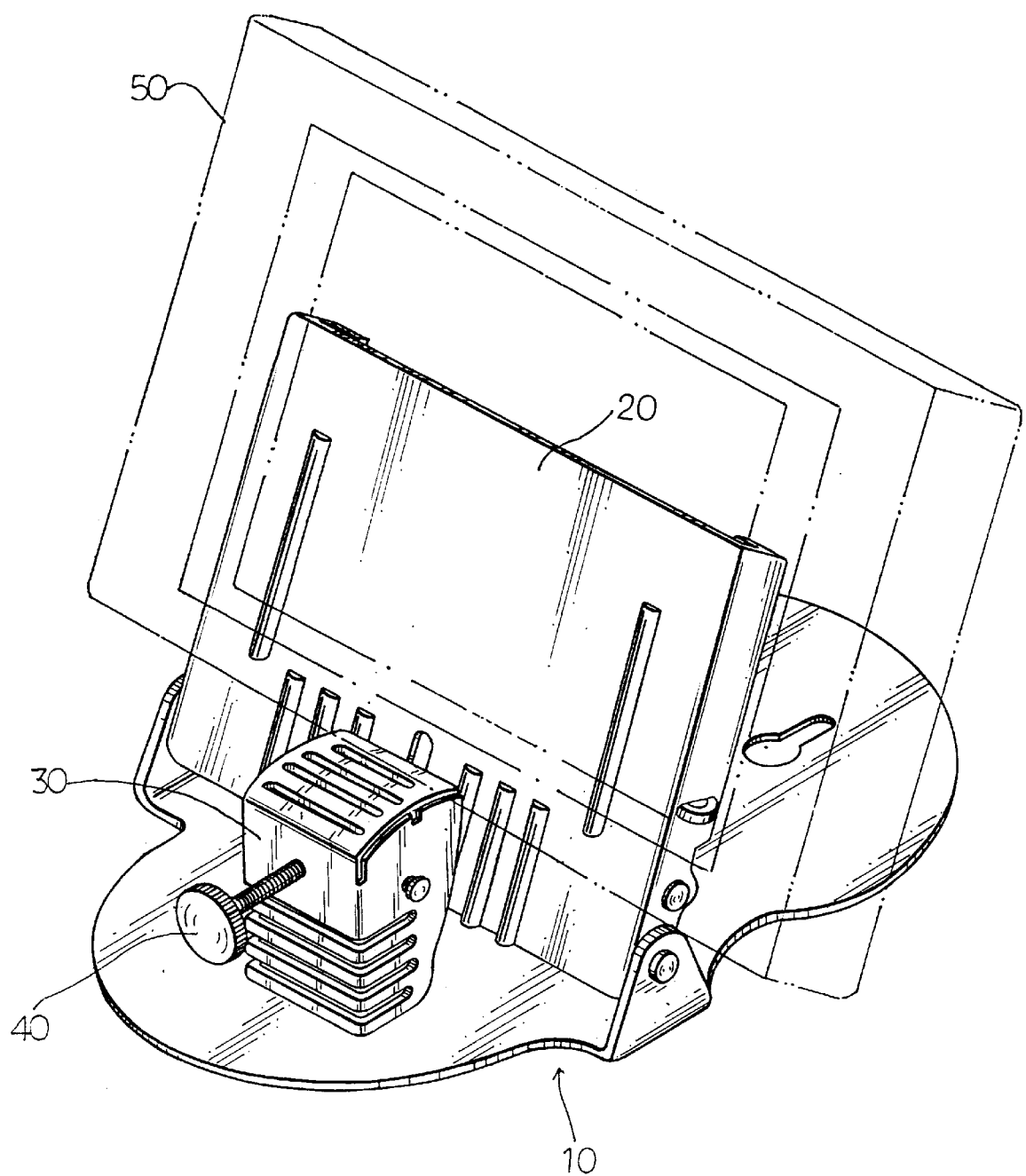
FIG. 1 is a perspective assembled view of the present invention.
Figure 2:
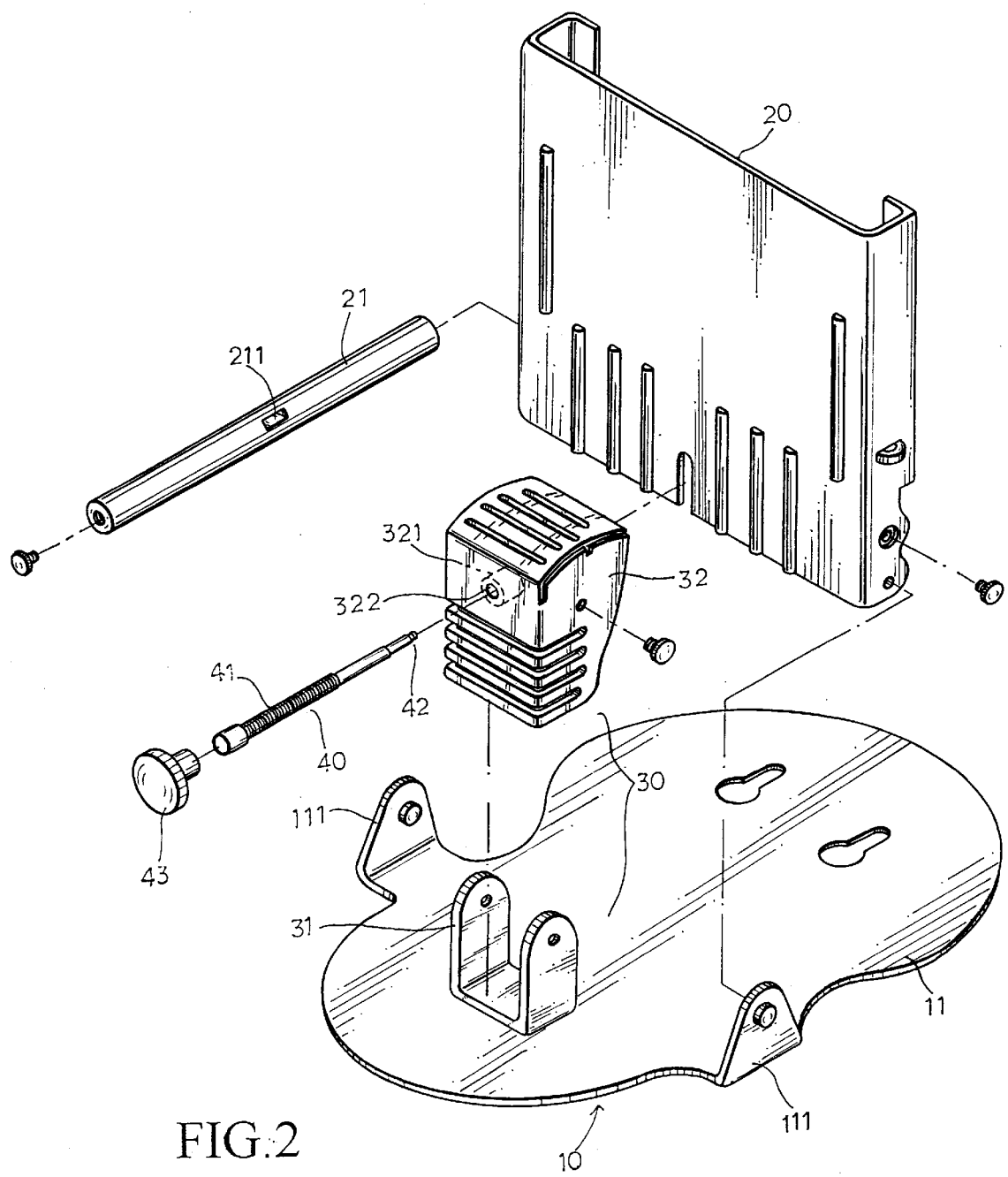
FIG. 2 is a perspective disassembled view of the present invention.

Please refer to FIGS. 1 and 2. The present invention includes a base seat 10 having a seat face 11 disposed with two projections 111 for pivotally connecting with a support 20 of the liquid crystal type display 50. A bridge mechanism 30 is disposed on the seat face 11 in front of the support 20, including a lug member 31 fixed on the seat face 11 and a pivotable housing 32 pivotally connected on the lug member 31. The housing 32 includes a sleeve member 321 disposed therein and formed with thread hole 322, whereby an adjustment rod 40 with a thread rod 41 can be screwed through the thread hole 322 with an end 42 pivotally located in a pivot section 211 of a transverse shaft 21 of the support 20. Accordingly, the adjustment rod 40 is more stably assembled with the support 20.

Figure 3:
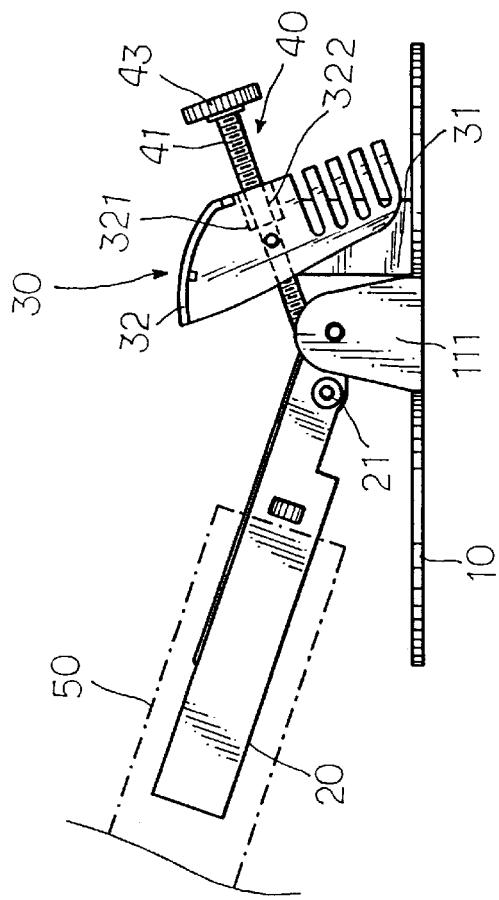
FIG. 3 is a side view showing the operation of the present invention in one state.
Figure 4:
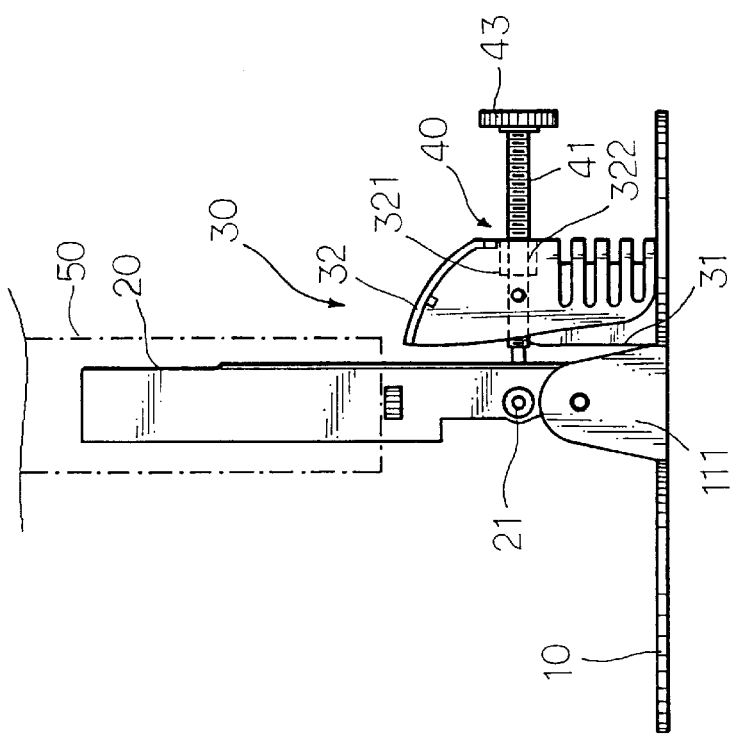
FIG. 4 is a side view showing the operation of the present invention in another state.

Referring to FIGS. 3 and 4, the angle of the support 20 is controlled by the cooperation position of the adjustment rod 40 and the bridge mechanism 30. In the case that the head end 43 of the adjustment rod 4 is close to the bridge mechanism 30 and the sleeve member 321, the support 20 is adjacent to the seat face 11 as shown in FIG. 3. In the case that the head end 43 is away from the bridge mechanism 30 and the sleeve member 321, the tail end 42 of the adjustment rod located on the shaft member 21 will drive the support 20 to rotate and change the observation angle of the display 50.

Figure 5:
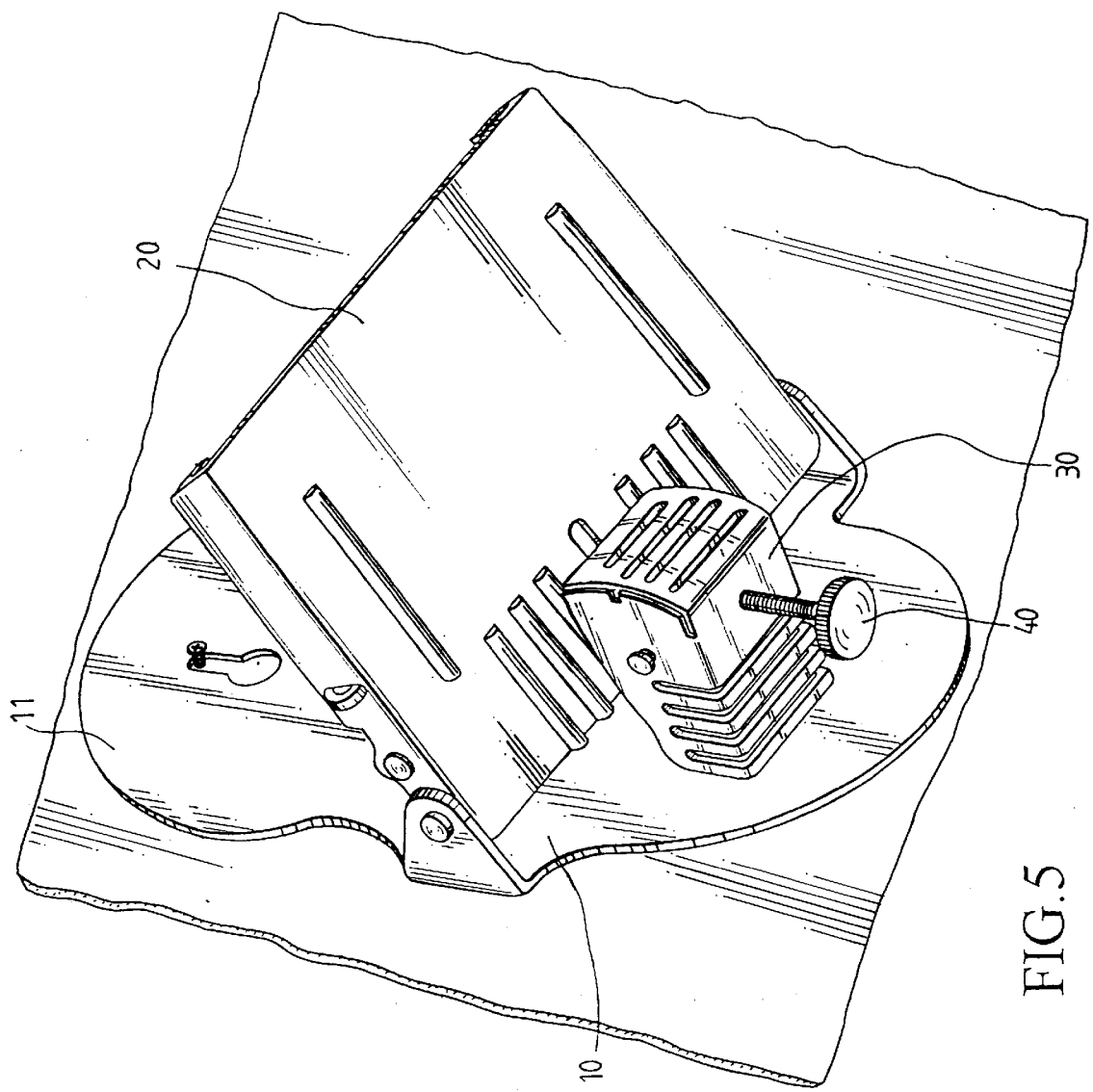
FIG. 5 shows that the present invention is hung on a wall.

The advantages of the present invention are as follows:

1. The housing 32 of the bridge mechanism 30 is pivotally connected with the lug member 31, whereby the housing 32 can be moved within a set range relative to the change of angle of the support 20 and the adjustment rod 40 without interference.
2. By means of cooperation between the adjustment rod 40 and the sleeve member 321, the observation angle of the support 20 and the display 50 can be adjusted and accurately fixed. This is applicable to the situation that the base seat is hung on a wall with the display extending outward as shown in FIG. 5.

After passed through the sleeve member 321, the adjustment rod 40 can control the movement of the support 20 and locate the same.

It should be noted that the above description and accompanying drawings are only used to illustrate one embodiment of the present invention, not intended to limit the scope thereof. Any modification of the embodiment should fall within the scope of the present invention.

What is claimed is:

1. A base seat structure for liquid crystal type display, comprising a base seat having a seat face and a support pivotally connected on the seat face, seat structure being characterized in that:

a bridge mechanism disposed on the seat face and a sleeve member; and an adjustment rod passed through the sleeve member, a tail end of the adjustment rod being pivotally connected with the support for controlling the movement and position of the support.

2. A base seat structure as claimed in claim 1, wherein the seat face is disposed with a projection adapted to be pivotally connecting with the support.

3. A base seat structure as claimed in claim 1, wherein the bridge mechanism comprises:

a lug member fixed on the seat face;

a pivotable housing pivotally connected with the lug member; and said sleeve member disposed in the housing and formed with a thread hole through which the adjustment rod is screwed.

4. A base seat structure as claimed in claim 1, wherein the adjustment rod includes a thread section and a head end.

5. A base seat structure as claimed in claim 3, wherein the adjustment rod includes a thread section and a head end.

6. A base seat structure as claimed in claim 1, wherein the tail end of the adjustment rod is pivotally located on a transverse shaft of the support.

* * * * *